US009495214B2

(12) United States Patent
Tatsubori et al.

(10) Patent No.: US 9,495,214 B2
(45) Date of Patent: *Nov. 15, 2016

(54) DYNAMIC RESOURCE ALLOCATIONS METHOD, SYSTEMS, AND PROGRAM

(75) Inventors: Michiaki Tatsubori, Kanagawa-ken (JP); Yohei Ueda, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 13/443,945

(22) Filed: Apr. 11, 2012

(65) Prior Publication Data

US 2012/0259982 A1 Oct. 11, 2012

(30) Foreign Application Priority Data

Apr. 11, 2011 (JP) .................................. 2011-086958

(51) Int. Cl.
*G06F 9/50* (2006.01)

(52) U.S. Cl.
CPC ..... *G06F 9/5027* (2013.01); *G06F 2209/5014* (2013.01)

(58) Field of Classification Search
CPC ............... G06F 9/5027; H04L 43/062; H04L 41/0823; H04L 41/0833; H04L 29/08144; H04L 29/06; H04L 29/08072; H04L 29/08171
USPC ........................................................ 709/226
See application file for complete search history.

(56) References Cited

U.S. PATENT DOCUMENTS

| | | | | |
|---|---|---|---|---|
| 2008/0201479 | A1* | 8/2008 | Husain et al. | 709/227 |
| 2008/0229415 | A1* | 9/2008 | Kapoor et al. | 726/22 |
| 2010/0274890 | A1* | 10/2010 | Patel et al. | 709/224 |
| 2011/0295999 | A1* | 12/2011 | Ferris et al. | 709/224 |

FOREIGN PATENT DOCUMENTS

| | | |
|---|---|---|
| JP | 11-282695 A | 10/1999 |
| JP | 2002-163241 A | 6/2002 |
| JP | 2003-162516 A | 6/2003 |
| JP | 2005-141605 A | 6/2005 |
| JP | 2009-037369 A | 2/2009 |

OTHER PUBLICATIONS

Kossman, Kraska, Loesing: An evaluation of alternative architectures for transaction processing in the cloud, SIGMOD 2010, pp. 579-590.
Kraska, Hentschel, Alonso, Kossman: Consistency Rationing in the Cloud: Pay only when it matters. VLDB 2009, pp. 253-264.
Binnig, Kossman, Kraska, Loesing: How is the weather tomorrow?: towards a benchmark for the cloud. DBTest 2009.

* cited by examiner

*Primary Examiner* — Vivek Srivastava
*Assistant Examiner* — Hien Doan
(74) *Attorney, Agent, or Firm* — Stephen R. Tkacs; Stephen J. Walder, Jr.; Kurt P. Goudy

(57) ABSTRACT

A dynamic resource allocation method and system. The method includes the steps of preparing a plurality of instances in different preparation states; receiving a request on a dynamic scheduling condition from the client computer; and launching some of the plurality of instances in the different preparation states in such a combination that the dynamic scheduling condition is satisfied. The method includes computer apparatus for accomplishing the above method. A tangible storage medium includes program steps which, when executed by computer apparatus, causes the computer apparatus to perform the above method.

11 Claims, 16 Drawing Sheets

| Resource/ Preparation State | Time To Reach Running State | Certainty (Standard Deviation) | Upper Limit | Physical Memory $0.6/day | Runtime Storage $0.5/day | OS Memory $0.4/day | Image Storage $0.3/day | Idle Node $0.2/day | Cost |
|---|---|---|---|---|---|---|---|---|---|
| Running (app) | 0.01 ms | 0.003 | Best Effort | Essential | Essential | Essential | Essential | Essential | $2.0 |
| Swap-Out (app) | 30 sec | 3 | Best Effort | | Essential | Essential | Essential | Essential | $1.4 |
| Need-To-Launch | 3 min | 0.3 | Best Effort | | | Essential | Essential | Essential | $0.9 |
| Need-To-Boot (OS/VM) | 10 min | 1.0 | Best Effort | | | | Essential | Essential | $0.5 |
| Need-To-Install/ Configure | 30 min | 6 | Best Effort | | | | | Essential | $0.2 |
| Need-To-Purchase (OW) | 1 day | 0.2 | 20 | | | | | | $0.0 |
| Need-To-Purchase (HW) | 1 day | 0.3 | Unlimited | | | | | | $0.2 |

FIG. 14

DYNAMIC RESOURCE ALLOCATIONS METHOD, SYSTEMS, AND PROGRAM

This application claims priority under 35 U.S.C. 119 from Japanese Patent Application 2011-086958, filed Apr. 11, 2011, the entire contents of which are incorporated herein by reference.

BACKGROUND OF THE INVENTION

1. Field of the Invention

The present invention relates to controlling a server environment such as a cloud computing system. More particularly, it relates to dynamically changing resources to be provided to a client by the server environment, in response to a change in a service request from the client.

2. Description of Related Art

In recent years, data transfer rate among computers has increased because of the improvement in the communication infrastructure. Along with this trend, it has become possible to place a host computer not in a company but in a remote location such as overseas. This has led to emergence of vendors who set many servers and lend users predetermined applications, computation resources, storages, and the like for use. Such a mode of using computer resources is called cloud computing.

There are the following types of cloud computing.

SaaS (Software as a service): This is a type in which software is provided as a service. For example, clients are allowed to use a payroll calculating program.

PaaS (Platform as a service): This is a type in which a platform is provided as a service. Generally, this type is characterized in that application can be run without consideration of scaling. Specifically, as service requests from clients increase, the vendor of cloud computing automatically adds resources, and does not make the clients feel deterioration in performance. The platform includes middleware such as a database, an application execution environment, and a management tool.

IaaS (Infrastructure as a service): This is a type which provides an infrastructure such as a virtual machine and storage. Desired operating system or middleware can be installed in the provided infrastructure. In this case, clients have to consider the scaling.

One of the advantages of cloud computing, particularly with PaaS, is that the scale of servers can be flexibly changed in response to a change in the amount of service request.

A load balancer is one system which satisfies such a demand. For example, WebSphere (trademark) Virtual Enterprise can handle an increasing amount of requests within the capacity of multiple servers prepared in advance. However, in order to implement the system of load balancer, multiple servers are required to be prepared and run in advance. In this case, however, when clients are charged for all the active server instances, the charge is high.

A cloud API is another system. For example, Amazon (trademark) Web Service or the like do not control creation, launching and the like of server instances in a cloud. However, the cloud API has a problem that times required for the creation and launching of server instances are too long.

Japanese Patent Application Publication No. Hei 11-282695 relates to a method and an apparatus for controlling the number of servers in a multisystem cluster. In this technique, incoming work requests are organized into service classes, and each of the classes has a queue served by servers across the cluster. Each service class is assigned in advance a predetermined performance index. Each system selects one service class as a donor class for donating system resources and another service class as a receiver class for receiving system resources, based upon how well the service classes are meeting their goals. If the resource bottleneck causing the receiver class to miss its goals is the number of servers, each system determines how many servers should be added to the receiver class, based upon whether the positive effect of adding such servers on the performance index for the receiver class exceeds the negative effect of adding such severs on the performance index for the donor class.

Japanese Patent Application Publication No. 2002-163241 relates to dynamic reconfiguration of resources of a service provider in response to a change in demand. In the system disclosed herein, a load balancer assigns an access request (service request) from each client 1 to one of servers operating in a server cluster. Then, when the access increases or decreases, a management module gives an instruction to change the configuration of the server cluster, and adds a sever 6 to the server cluster or removes a server from the server cluster or the like. The management module reflects the change in configuration of the server cluster in an access assignment target list of the load balancer.

Japanese Patent Application Publication No. 2003-162516 relates to a high-speed large-volume-data processing system capable of dynamic and static configurations of resources such as networks, processors, and data storages and of dynamic and static allocation of data processing works in order to handle data processing requests of large-volume data issued from multiple users. Japanese Patent Application Publication No. 2003-162516 discloses a multiprocessor system and a data storage system which include a network backend server connecting multiple high-speed data processing devices and multiple data storage devices together via an ultra-high-speed network. In response to data processing requests issued from multiple terminal devices, the multiprocessor system and the data storage system can process large-volume-data at high speed by using a function of dynamically and statically distributing a network load and a data processing load. To this end, with the positions of the data storages in the network, the network load, and the data processing load dynamically and statically taken into consideration, a network topology and a processor topology are dynamically and statically configured and the data processing works are dynamically and statically distributed to the multiple high-speed data processing devices.

Japanese Patent Application Publication No. 2005-141605 relates to a resource distribution method capable of sharing excess resources among multiple services and thus reducing the maintenance cost of the excess resources. In this resource distribution method, a standby computer resource is in a dead standby state where at least no application is installed and the computer resource in the dead standby state is shared among multiple services or multiple users. This achieves an improvement in usage rate of idle computer resources and integration of servers, thereby leading to reduction in cost required to maintain the computer resources. Moreover, load prediction is performed by using operation histories of respective services, and idle computer resources reserved and kept for services are inputted to the services according to the prediction result, starting from a service predicted to have an excess resource.

Japanese Patent Application Publication No. 2009-37369 discloses a technique to solve a problem that a batch process cannot be completed within a preset requested time due to increase in data amount or simultaneous execution of multiple batch processes. In the technique, a processing time and a resource usage amount of a batch process procedure not yet executed are calculated based on a processing time and a resource usage amount of already-executed SQL, during execution of batch processes. Thereafter, the process procedure and the resource usage amounts are recalculated by using information on OS such as the number of I/O and a CPU load and information indicating the state of database server such as a buffer hit ratio. Then, the resources are allocated as needed.

The following non-patent literature in this technical field provides further background.

Donald Kossmann, Tim Kraska, Simon Loesing: An evaluation of alternative architectures for transaction processing in the cloud, SIGMOD 2010, pp. 579-590 describes transaction processing in cloud computing.

Tim Kraska, Martin Hentschel, Gustavo Alonso, Donald Kossmann: Consistency Rationing in the Cloud: Pay only when it matters. VLDB 2009, pp. 253-264 describes a transaction paradigm that not only allows designers to define the consistency guarantees on the data, but also allows to switch consistency guarantees at runtime.

Carsten Binnig, Donald Kossmann, Tim Kraska, Simon Loesing: How is the weather tomorrow?: towards a benchmark for the cloud. DBTest 2009 describes benchmarking such as scalability and fault-tolerance of a system of cloud computing.

These conventional arts each teach a technique with which a cloud computing system allocates resources as needed in response to a service request.

Meanwhile, particularly in PaaS, there is a demand for a technique which efficiently allocates resources to dynamically-changing loads of service requests while satisfying required speed and certainty. However, the conventional arts described above do not sufficiently meet such a demand.

SUMMARY OF THE INVENTION

In accordance with one aspect of the present invention, a dynamic resource allocation method for a server system having resources including a plurality of computing nodes includes the steps of: preparing instances in different preparation states; receiving a request on a dynamic scheduling condition from the client computer; and launching at least two of the instances in the different preparation states in a combination to achieve the dynamic scheduling.

In accordance with another aspect of the present invention, a computer readable storage medium tangibly embodies computer readable program code which, when executed, cause a computer to carry out the steps of the above method for dynamic resource allocation.

In yet another aspect of the present invention, a dynamic resource allocation system in a server system having resources including a plurality of computing nodes, includes: a module for preparing a plurality of instances in different preparation states; a module for receiving a request on a dynamic scheduling condition from the client computer; and a module for launching at least two of the plurality of instances in the different preparation states to achieve the dynamic scheduling condition.

BRIEF DESCRIPTION OF THE DRAWINGS

FIG. 14 shows a correspondence between a preparation state of resources and cost.

DETAILED DESCRIPTION OF THE PREFERRED EMBODIMENTS

Figure 1:
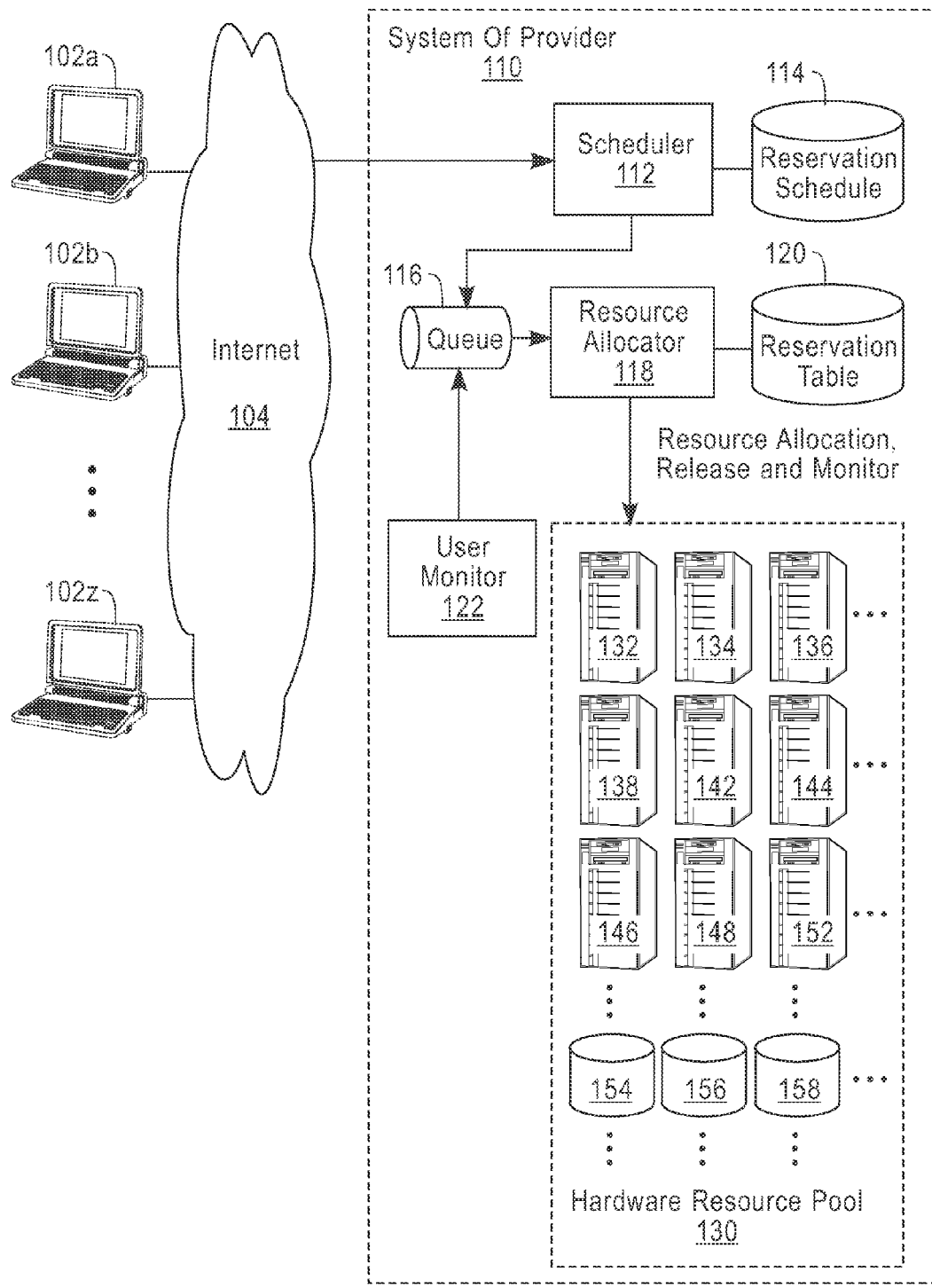
FIG. 1 is an overview of an entire configuration for carrying out the present invention.

With the present invention a service such as cloud computing can meet a quality requirement of dynamic scalability from a client within a certain range of certainty.

The above is achieved by making an index on a quality requirement of dynamic scalability variable and by providing a platform service which includes various means in different preparation states in combination to satisfy a given index.

More particularly, an upper limit of expansion of platform capacity and a request on expansion speed are used as the index on the quality requirement of dynamic scalability guaranteed of a certain level of certainty. To satisfy this requirement, a cloud server of the present invention provides a combination of platforms in various preparation states such as a hot standby, a swap-out state, and a cold standby.

In the cloud server of the present invention, storage resources, for example, are shared between different reservations while are redundantly allocated to multiple actual resources. Moreover, scaleup states of all users are constantly monitored, and the sharing and redundancy are adjusted to satisfy a given certainty.

In the operation, the user of the service such as cloud computing makes a service level agreement (SLA) on predetermined dynamic scalability with a provider of cloud computing in advance. The service described here is assumed to be mainly PaaS although not limited to this. The user sends requests to the cloud server as needed. The cloud server temporarily puts the received requests in a queue and sequentially processes the requests.

The requests include Up event processing being a request from the user to add a virtual machine (VM) and Down event processing being a request from the user to delete a virtual machine (VM).

When the request is the Up event processing, the cloud server updates a reservation table of the resource, adds a corresponding VM instance, deletes the CPU (ID) to be used from a pool set of CPUs (IDs), and performs resource allocation adjustment processing.

Meanwhile, when the request is the Down event processing, the cloud server deletes a corresponding VM instance, returns a CPU (ID) which has become available by the deletion to the pool set of CPUs (IDs), and judges whether a certainty is satisfied. Here, "certainty is satisfied" refers to a state where a current certainty of reservation is larger than a certainty requested in the service level agreement. If the certainty is not satisfied, the cloud server checks the pool set of CPUs and judges whether a CPU is allocatable; i.e., whether it can be allocated. If the CPU is allocatable, the cloud server adds the hardware resource.

The certainty can be probabilistically calculated according to, for example, the Poisson distribution or the like.

The present invention makes it possible to provide dynamic scalability to a user in a reasonable charge in a server providing a service such as cloud computing. For example, such a request to increase "100 instances in 30 minutes at a certainty of 80%" can be handled. Moreover, a charge appropriate for such a condition can be set. This makes it possible to provide a new SLA.

An embodiment of the present invention is described below with reference to the drawings. If not stated otherwise, the same reference numerals denote the same objects in all of the drawings. Moreover, note that what is described below is one embodiment of the present invention and there is no intention of limiting the present invention to contents described using the embodiment.

FIG. 1 is a view showing an overview of an entire system for carrying out the present invention. Client computers 102a, 102b, . . . 102z used by users of a cloud server are connected to the Internet 104 via an appropriate proxy server and the like, although not illustrated in detail.

The client computers 102a, 102b, . . . 102z are further connected to a cloud service, particularly to a system 110 of a PaaS service provider via the Internet 104.

The system 110 includes a scheduler 112, data 114 of a reservation schedule of the scheduler 112 which is preferably stored in a hard disk, a queue 116 used to put therein requests from the client computers, a resource allocator 118, data 120 of a reservation table which is preferably stored in a hard disk and which is referred to and updated by the resource allocator 118, a user monitor 122 configured to monitor the states of the users on the basis of data on the queue 116, and a hardware resource pool 130. The hardware resource pool 130 includes multiple computers (computing nodes) 132, . . . 152 which serve as a computing resource and disk storage devices 154, 156, 158 . . . which serve as a storage resource and which are a storage area network (SAN), a network attached storage (NAS), or remote disk devices.

The scheduler 112 receives the requests from the client computers 102a, 102b, . . . 102z and temporarily stores the requests in the reservation schedule 114. Then, at the time and date specified by each of the requests, the scheduler 112 puts the request into the queue 116 and leaves the request to be processed by the resource allocator 118.

In the embodiment, each of the users of a service such as cloud computing makes a service level agreement (SLA) on predetermined dynamic scalability with the provider of cloud computing in advance. The contents of such an agreement are stored in a predetermined system of the provider in advance and are referenced as needed. The contents of such an agreement may be included in the reservation schedule 114, for example.

The request may include the contents of the service level agreement on dynamic scalability, Up event processing being a request from the user to add a virtual machine (VM), and Down event processing being a request from the user to delete a virtual machine (VM).

When the request is the Up event processing, the resource allocator 118 updates the reservation table 120, adds a VM instance, allocates a hardware resource (particularly, CPUs) to be used from the hardware resource pool 130 and adjusts the hardware resource. The CPUs herein specifically refer to the computers (computing nodes) 132, 134, and the like in the hardware resource pool 130.

Meanwhile, when the request is the Down event processing, the resource allocator 118 deletes the VM instance, returns a CPU which has become available by the deletion to a resource pool of the CPUs, and judges whether a certainty is satisfied. Here, "certainty is satisfied" refers to a state where a requested certainty of a reservation which complies with the service level agreement is larger than a current certainty of the reservation. If the certainty is satisfied, the resource allocator 118 refers to the reservation table 120 and judges whether a CPU is allocatable. If the CPU is allocatable, the resource allocator 118 adds the CPU.

The resource allocator 118 not only allocates and releases the resources of the hardware resource pool 130 depending on the requests from the clients, but also has a role of monitoring the operation state of the hardware resource pool 130.

Furthermore, functions of the scheduler 112, the resource allocator 118, and the user monitor 122 can be implemented as software installed in a hard disk of computer hardware. The software is executed by being loaded to a main memory of the computer hardware by the work of an operating system installed in the computer hardware.

The scheduler 112, the resource allocator 118, and the user monitor 122 are preferably executed in the same computer hardware. The reservation schedule 114 and the reservation table 120 may be stored in the hard disk of the computer hardware. Alternatively, part of the scheduler 112, the resource allocator 118, the user monitor 122, the reservation schedule 114, and the reservation table 120 may be provided in different computer hardware connected via a network.

Next, an example of a configuration of the client computers 102a, 102b, . . . 102z is described with reference to FIG. 2.

Figure 2:
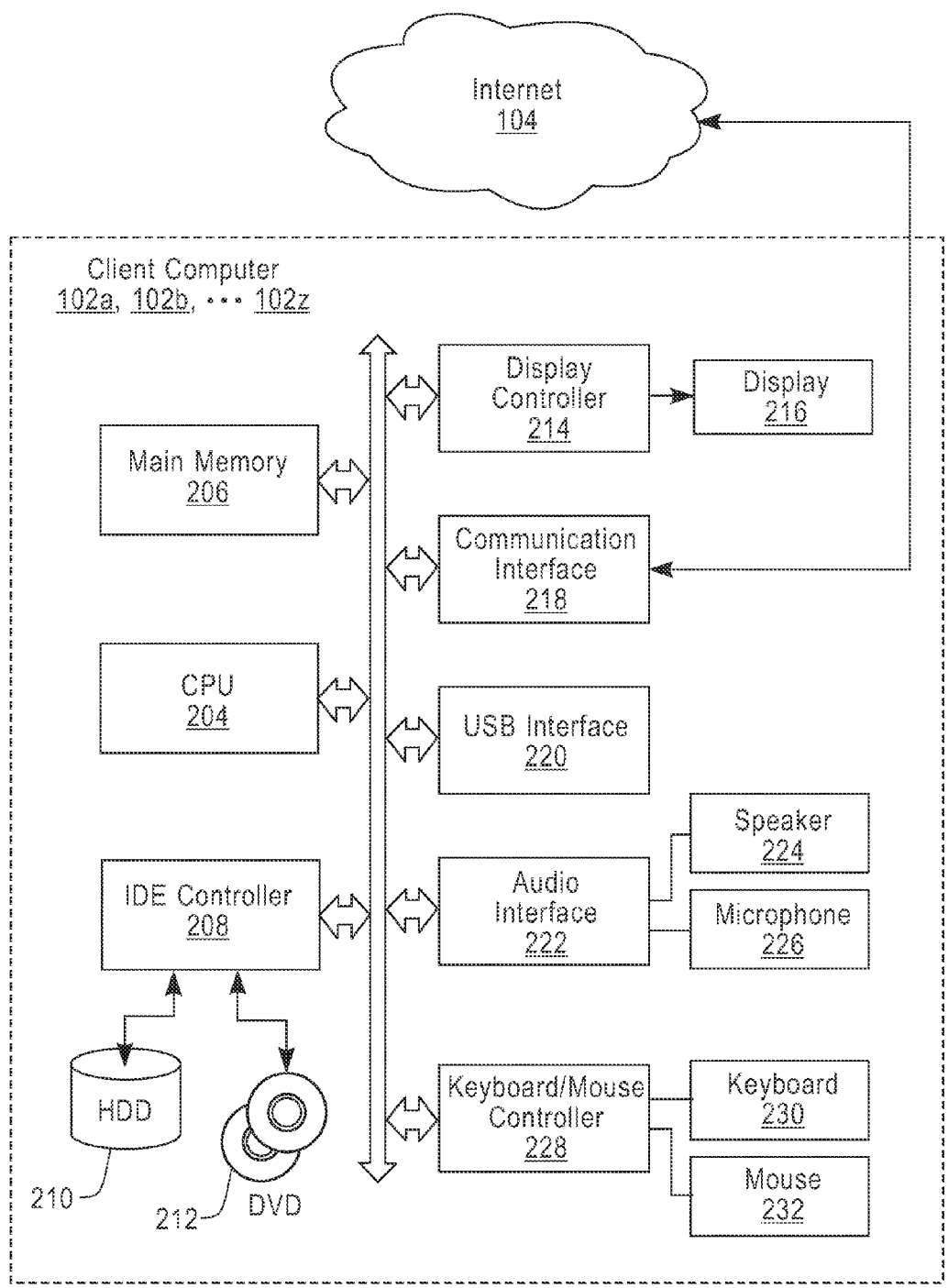
FIG. 2 is a block diagram of a configuration of an example of a client computer.

Descriptions are given of a hardware block diagram of the client computer denoted by reference numerals 102a, 102b, . . . 102z in FIG. 1 with reference to FIG. 2. In FIG. 2, the client computer includes a main memory 206, a CPU 204, and an IDE controller 208, and these elements are connected to a bus 202. A display controller 214, a communication interface 218, a USB interface 220, an audio interface 222, and a keyboard/mouse controller 228 are also connected to the bus 202. A hard disk drive (HDD) 210 and a DVD drive 212 are connected to the IDE controller 208. The DVD drive 212 is used to install a program from a CD-ROM or a DVD as needed. A display device 216 having an LCD screen is preferably connected to the display controller 214. A screen of an application is displayed in the display device 216 by using a Web browser.

A device such as an expansion hard disk can be connected to the USB interface 220 as needed.

A keyboard 230 and a mouse 232 are connected to the keyboard/mouse controller 228. The keyboard 230 and the mouse 232 are used to create a program using an API defined by the provider, the program created by using a predetermined program such as a text editor.

The CPU 204 can be any CPU based on, for example, a 32 bit architecture or a 64 bit architecture. Specifically, any one of Pentium (trademark of Intel Corporation) 4 and Core (trademark) 2 Duo of Intel Corporation and Athlon (trademark) of Advanced Micro Devices, Inc. can be used.

At least an operating system and a Web browser (not illustrated) operating on the operating system are stored in the hard disk drive 210. When the system is started, the operating system is loaded to the main memory 206. Moreover, the text editor for creating a program to invoke an API, or a development environment such as Eclipse (trademark of Eclipse Foundation) is preferably used. Windows XP (trademark of Microsoft Corporation), Windows Vista (trademark of Microsoft Corporation), and Windows (trademark of Microsoft Corporation) 7, Linux (trademark of Linus Torvalds) or the like may be used as the operating system. Moreover, any Web browser can be used such as Internet Explorer of Microsoft Corporation and Mozilla FireFox of Mozilla Foundation.

The communication interface 218 uses a TCP/IP communication function provided by the operating system to communicate with the Internet 104 by using Ethernet (trademark) protocol or the like.

Although not limited to the following method, one method of creating a program using the API is to write the program in the following way. For example, tags of JavaScript™ are attached to a Web page to be created, by using a tool of the development environment. A predetermined URL provided by the provider is specified by using src=" " in the Web page, and a function defined by the API is invoked together with a predetermined argument.

Figure 3:
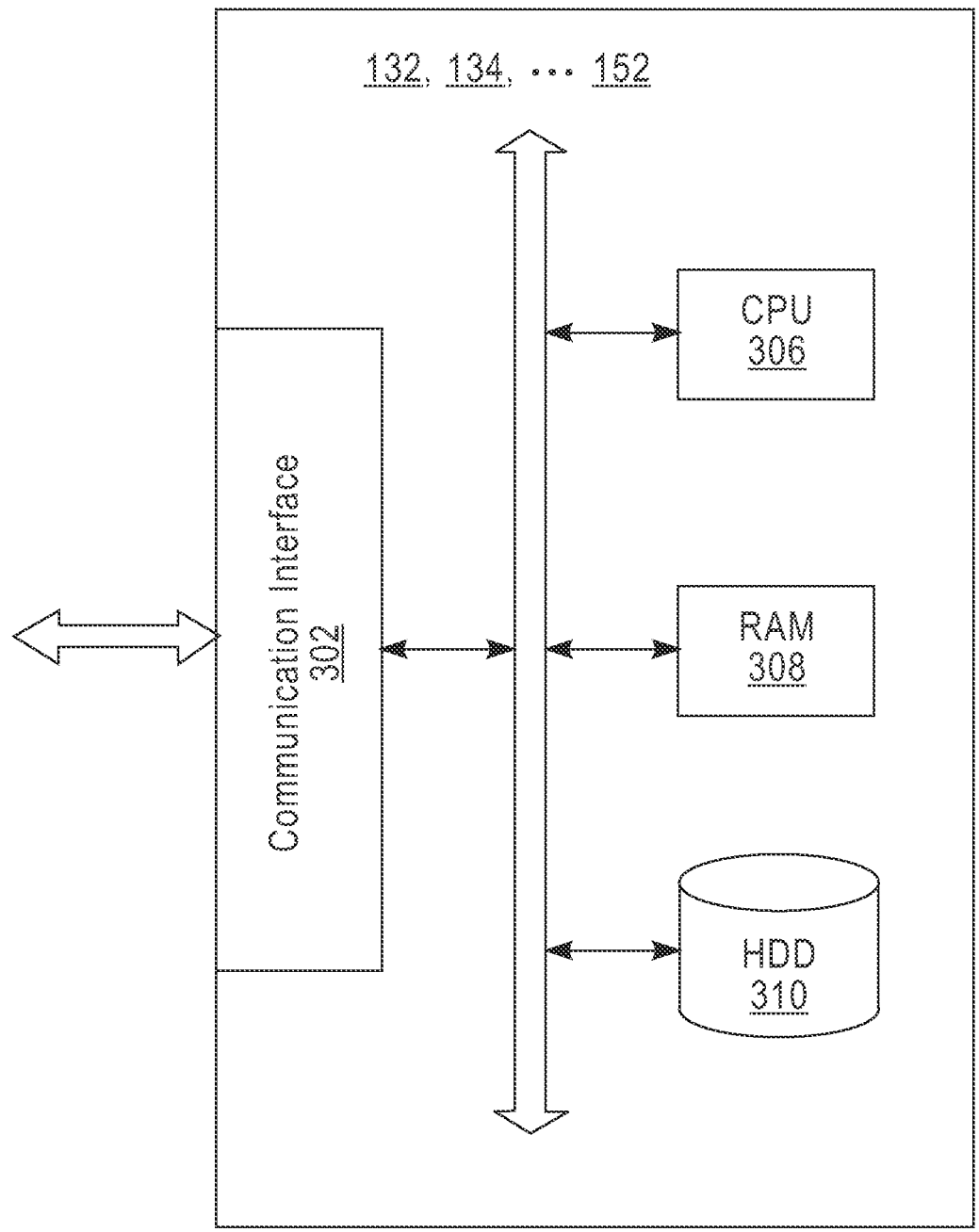
FIG. 3 is a block diagram of a configuration of an example of a server computer.

FIG. 3 is a schematic block diagram of a hardware configuration of the computers (computing nodes) 132, 134, . . . , 152 in the hardware resource pool 130. Each of the computers 132, 134, . . . , 152 has a communication interface 302. The communication interface 302 is connected to a bus 304. A CPU 306, a main memory (RAM) 308, and a hard disk drive (HDD) 310 are connected to the bus 304. The computers (computing nodes) 132, 134, . . . , 152 are preferably placed at the same site and are connected to each other with an in-house high-speed network connection network such as an optical fiber. Alternatively, the computers 132, 134, . . . , 152 are placed at locations remote from each other and are connected via Internet lines. Any computer hardware system matching the purpose such as IBM™ System X and IBM™ Power System™ can be used as the computers 132, 134, . . . , 152.

The computer system for running the scheduler 112, the reservation schedule 114, the queue 116, the resource allocator 118, the reservation table 120, and the user monitor 122 may be a computer system of the same type as the computers 132, 134, . . . , 152 and the like.

The hardware resource pool 130 of FIG. 1 may include SAN management hardware such as IBM™ System Storage SAN volume controller to integrate disk devices 154, 156, 158, and the like.

Figure 4:
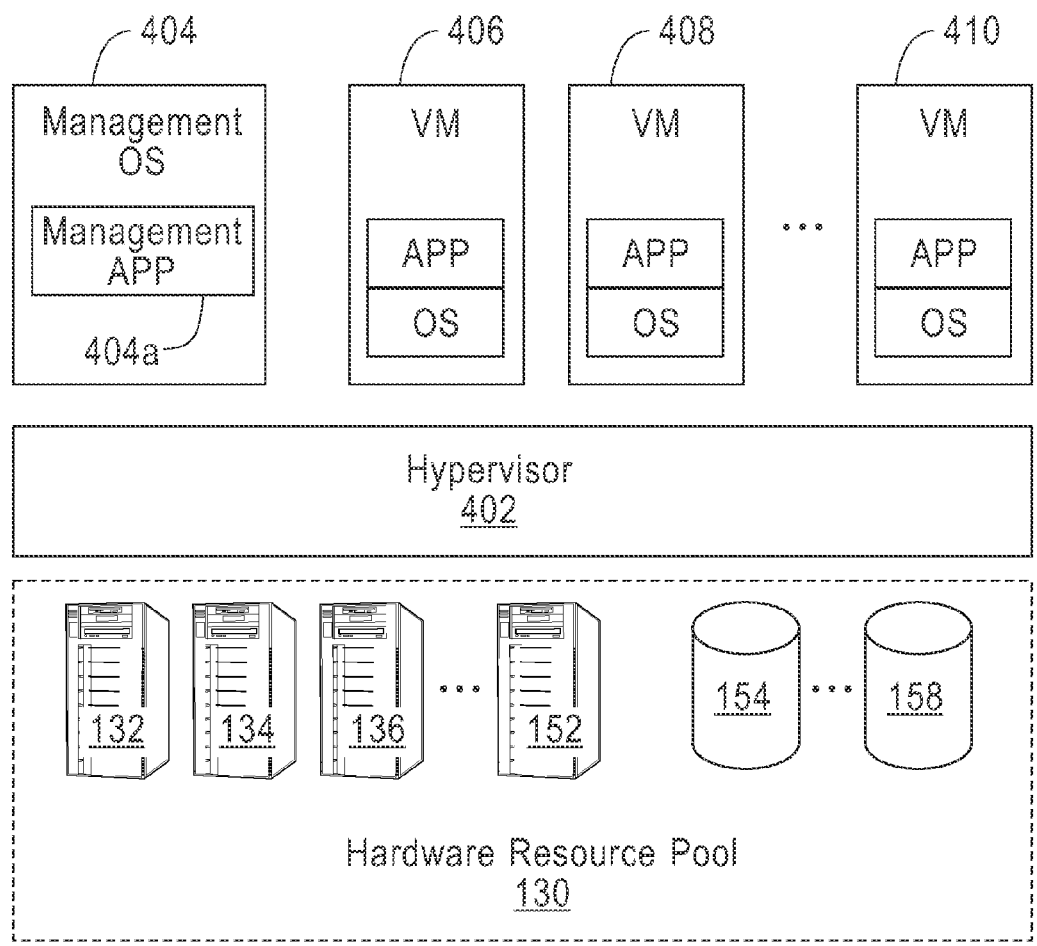
FIG. 4 is a block diagram of a configuration for virtualization.

FIG. 4 shows a hardware virtualization environment incorporating the system 110. In the computer system incorporating the resource allocator 118, a hypervisor 402 is incorporated and is set up. Xen, Hyper-V of Microsoft Corporation, VMware™ VMware, Inc., or the like can be used as the hypervisor 402, although not limited to these. In this embodiment, Xen is assumed to be used.

The hypervisor 402 virtualizes the computers 132, 134, . . . , 152, the disk devices 154, 156, and the like in the hardware resource pool 130.

Under the Xen serving as the hypervisor 402, a privileged virtual machine (VM) 404, which is also called domain 0, is created. The privileged virtual machine 404 includes a management application program (APP) 404*a* having a function of creating and deleting a virtual machine (VM), accessing the hardware resource pool 130, and other functions. The scheduler 112, the resource allocator 118, and the user monitor 122 shown in FIG. 1 are included in the management application program 404*a*.

The management application program 404*a* appropriately generates or deletes virtual machines (VM) 406, 408, . . . , 410 called domains U, in response to a request from the client.

Figure 5:
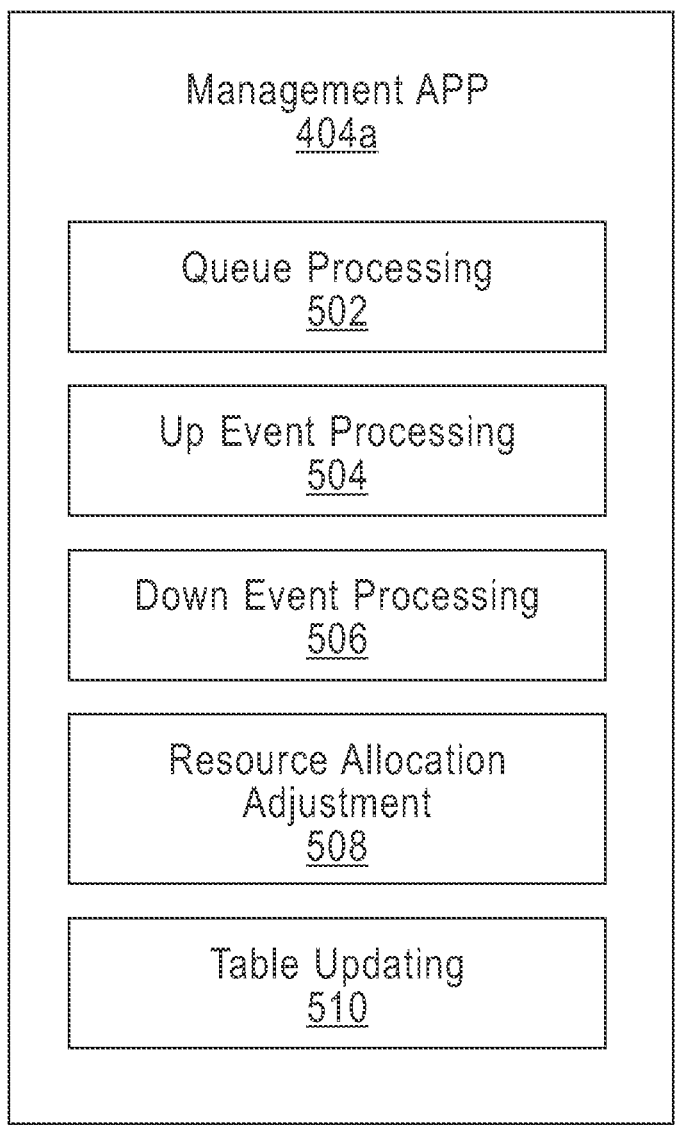
FIG. 5 is a block diagram of a configuration of a management application used for virtualization.

FIG. 5 is a view showing processing modules related to the present invention in the management application program 404*a*. As shown in the drawing, the management application program 404*a* includes a queue processing module 502, an Up event processing module 504, a Down event processing module 506, a resource allocation adjustment module 508, and a table updating (UpdateTable) module 510.

Figure 6:
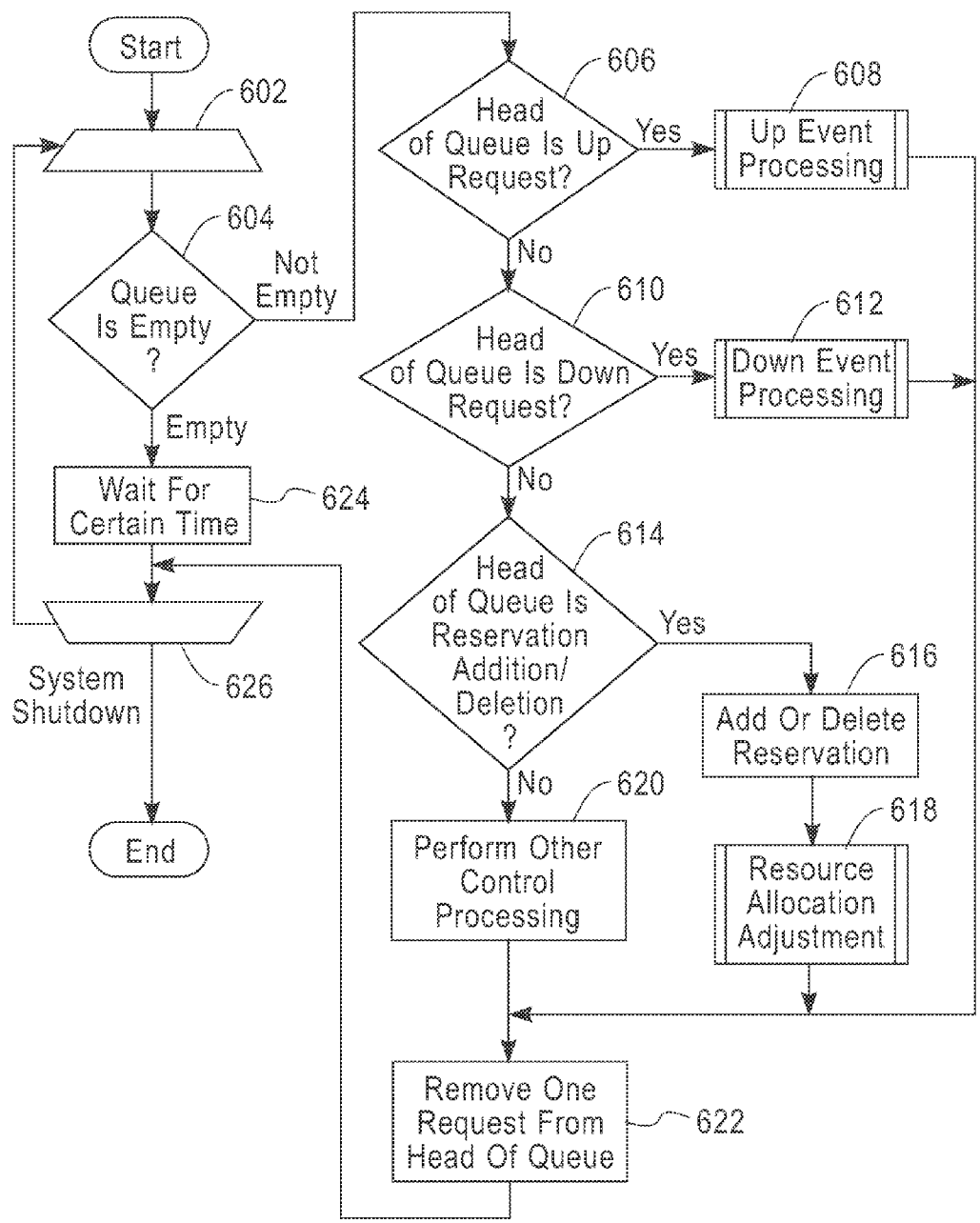
FIG. 6 is a flowchart of queue processing.

Next, processing of the queue processing module 502 is described with reference to the flowchart of FIG. 6. A basic operation of the queue processing module 502 is as follows. A loop from step 602 to step 626 is repeated until the shutdown of the system, and the requests in the queue 116 are sequentially processed.

In step 604, the queue processing module 502 judges whether the queue 116 is empty. When the queue 116 is not empty, the queue processing module 502 judges whether a request at the head of the queue is an Up request in step 606. When the request is the Up request, the queue processing module 502 invokes the Up event processing module 504 in step 608. Details of processing of the Up event processing module 504 are described later with reference to the flowchart of FIG. 7.

When the request at the head of the queue is not the Up request, the queue processing module 502 judges whether the request at the head of the queue is a Down request in step 610. When the request is the Down request, the queue processing module 502 invokes the Down event processing module 506 in step 612. Details of processing of the Down event processing module 506 are described later with reference to the flowchart of FIG. 8.

When the request at the head of the queue is not the Down request, the queue processing module 502 judges whether the request at the head of the queue is a reservation addition/deletion in step 614. When the request is the reservation addition/deletion, the queue processing module 502 performs processing of adding or deleting a reservation in step 616. A requested dynamic scheduling condition is included in the reservation. The processing of adding or deleting a reservation which is performed herein is reflected in the reservation schedule 114.

Then, the queue processing module 502 invokes the resource allocation adjustment module 508 in step 618. The resource allocation adjustment module 508 is described later with reference to the flowchart of FIG. 9.

When the request at the head of the queue 116 is not the reservation addition/deletion in step 614, other control processing is performed in step 620.

After step 608, 612, 618, or 620 the queue processing module 502 removes one request from the head of the queue in step 622 and returns to the loop of step 626.

Returning to step 604, when the queue processing module 502 judges that the queue 116 is empty, the queue processing module 502 waits for a certain time in step 624 and the processing returns to the loop of step 626.

Figure 7:
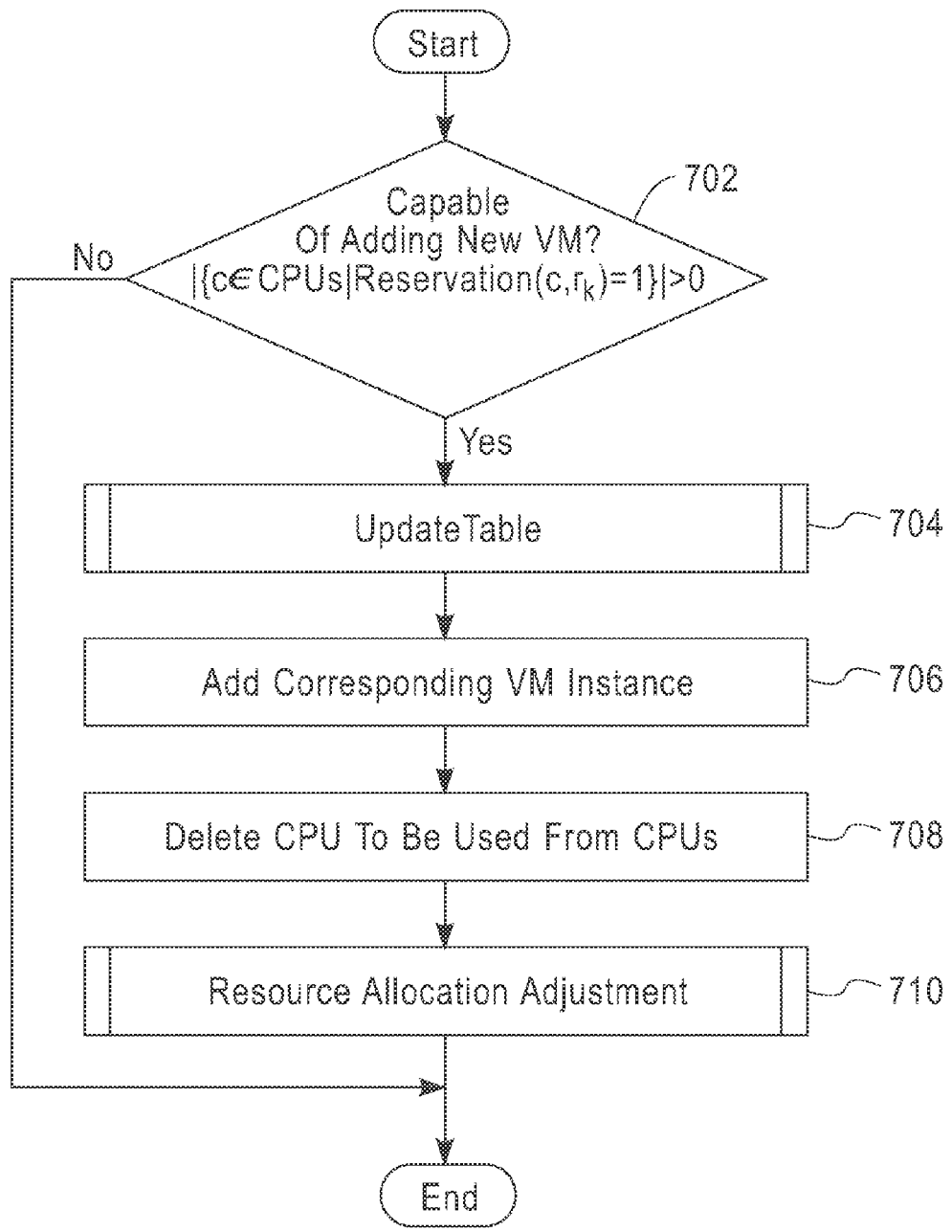
FIG. 7 is a flowchart of Up event processing.

Next, the Up event processing module 504 is described with reference to the flowchart of FIG. 7. In step 702, the Up event processing module 504 determines whether a new VM can be added. When this determination is expressed by using a formula, it is equivalent to judging whether $|\{c \in CPUs | Reservation(c, r_k)=1\}|>0$ is satisfied. In this formula, CPUs is a set of IDs of CPUs in the hardware resource pool 130, $r_k$ is a reservation ID, and Reservation(c, $r_k$)=1 means that an element c of the CPUs is reserved in the reservation ID. In other words, in step 702, it is determined whether one or more elements of CPUs are reserved in the reservation ID.

If there is no element, the Up event processing module 504 immediately terminates the processing. Meanwhile, when it is determined in step 702 that one or more elements of the CPUs are reserved in the reservation ID, the Up event processing module 504 invokes the UpdateTable (table updating) module 510 and updates the reservation table 120 in step 704. The processing of the Table updating module 510 is described later with reference to flowcharts of FIGS. 10 and 11.

The Up event processing module 504 adds a corresponding VM instance in step 706 and deletes the ID of the CPU to be used from the CPUs being the set of IDs of CPUs in step 708.

Subsequently, the Up event processing module 504 invokes the resource allocation adjustment module 508 in step 710. The resource allocation adjustment module 508 is described later with reference to the flowchart of FIG. 9.

Figure 8:
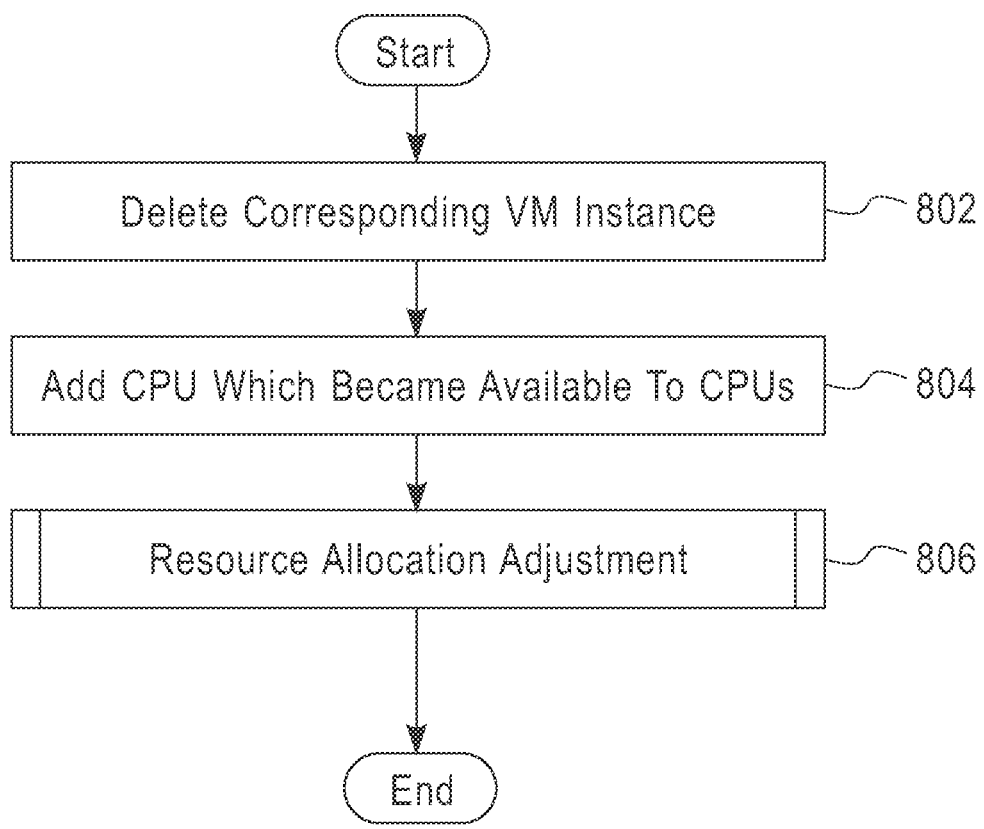
FIG. 8 is a flowchart of Down event processing.

Next, the Down event processing module 506 is described with reference to the flowchart of FIG. 8.

The Down event processing module 506 deletes a corresponding VM instance in step 802, and adds the ID of a CPU which became available to the CPUs being the set of IDs of the CPUs in step 804.

Subsequently, the Down event processing module 506 invokes the resource allocation adjustment module 508 in step 806. The resource allocation adjustment module 508 is described later with reference to the flowchart of FIG. 9.

Figure 9:
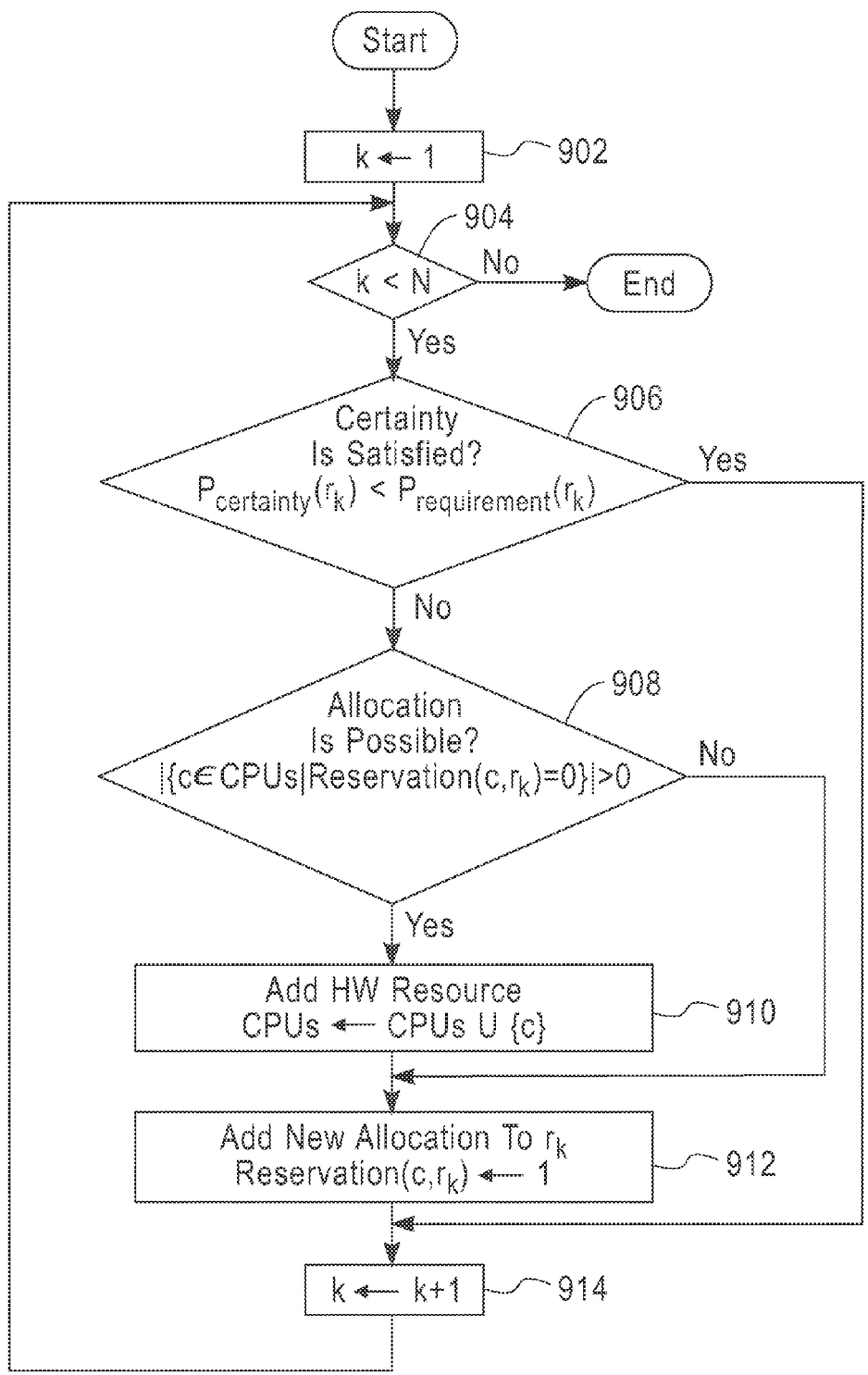
FIG. 9 is a flowchart of resource allocation adjustment processing.

Next, processing of the resource allocation adjustment module 508 is described with reference to FIG. 9. The resource allocation adjustment module 508 stores 1 in a variable k in step 902. Then, in step 904, the resource allocation adjustment module 508 judges whether k<N is satisfied. Here, N is the number of all of the reservations made by the clients. When k<N is not satisfied, i.e. when k reaches N, the resource allocation adjustment module 508 terminates the processing.

Meanwhile, when k<N is satisfied, the resource allocation adjustment module 508 judges whether the certainty is satisfied by using the following formula.

$$P_{certainty}(r_k) < P_{requirement}(r_k)$$

In this formula, $P_{certainty}(r_k)$ is the requested certainty of the reservation $r_k$ and is defined by the cloud user.

Generally, the certainty of a reservation rid creating n instances is given by the following formula.

$$P_{certainty}(rid) = \sum_{S \in \{cid | Reservation \, n(cid, rid)=1\} s.t. |S| \geq n} \left( \prod_{cid \in S} P_{certainty}(cid, rid) \right)$$ [Formula 1]

$P_{certainty}(cid,rid)$ is given by the following formula.

$$P_{certainty}(cid, rid) = \prod_{r \neq rid, r \in Reservations} (1 - P_{scaleup}(cid, r))$$ [Formula 2]

In this formula, Reservations is a set of reservations and $P_{scaleup}(cid, rid)$ is a cid of CPU. A probability of one instance of the reservation rid being created is given by the following formula.

$$P_{scaleup}(cid, rid) = P_{scaleup}(rid) \times \frac{Reservation(cid, rid)}{\sum_{c \in CPUs} Reservation(c, rid)}$$ [Formula 3]

Reservation(cid, rid)$\in\{0, 1\}$ represents a reservation of cid of CPU, and $$\sum_{c \in CPUs} Reservation(c, rid)$$ [Formula 4]

represents the number of multiplexes. Moreover, $P_{scaleup}(rid)$ is the average number of occurrences of Up event of reservation rid, and is preferably calculated under the assumption that history data of the past Up events follow the Poisson distribution.

When it is determined that $P_{certainty}(r_k) < P_{requirement}(r_k)$ is not satisfied as a result of the calculations describe above, the processing proceeds to step 914 and k is incremented by 1. Then, the processing returns to step 904.

Meanwhile, when it is determined that $P_{certainty}(r_k) < P_{requirement}(r_k)$ is satisfied, the processing proceeds to step 908, and the resource allocation adjustment module 508 judges whether allocation is possible by using the following formula.

$$|\{c \in CPUs | Reservation(c, r_k)=1\}|>0$$

The meaning of this formula is as described in step 702.

Then, when it is determined that the allocation is possible, the resource allocation adjustment module 508 adds a hardware resource to the CPUs by CPUs←CPUs ∪{c} in step 910.

After step 910, or when it is determined in step 908 that allocation is not possible, the resource allocation adjustment module 508 adds a new allocation to $r_k$ by Reservation(c, $r_k$)←1 in step 912. Thereafter, the processing proceeds to step 914 and k is incremented by 1. Then, the processing returns to step 904.

Next, processing of the table updating (UpdateTable) module 510 is described with reference to the flowcharts of FIGS. 10 and 11. The table updating module 510 handles the reservation table 120 having a format as shown in FIG. 12. In the reservation table 120, RID is an expansion reservation ID and is an ID provided for each agreement of expansion reservation. STEP is an ID of a virtual node prepared and reserved (for example, the fifth node among ten nodes in 30 minutes), and indicates such levels that preparation is completed stepwise in the ascending order thereof. GRADE is a state of preparation. Specifically, 0 represents a running state, 1 represents a swap-out state, 2 represents a need-to-launch state, 3 represents a need-to-boot state, 4 represents a need-to-install/configure state, 5 represents a need-topurchase (software) state, and 6 represents a need-to-purchase (hardware) state. CPUID is an ID of computing node actually allocated.

Figure 10:
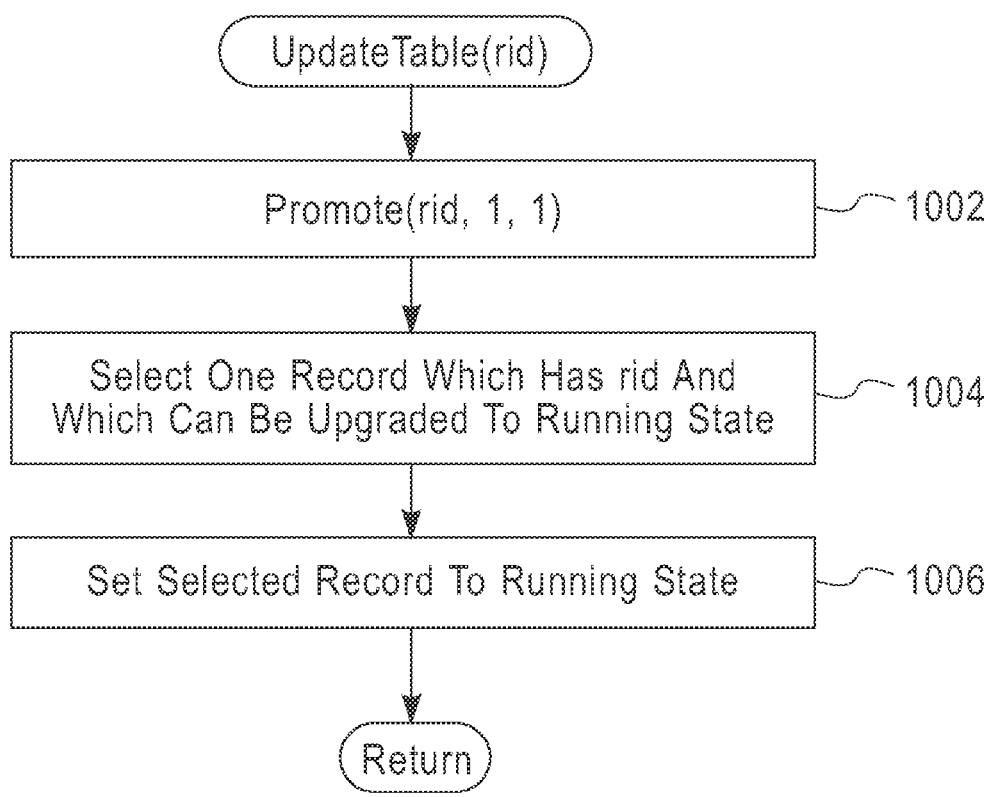
FIG. 10 is a flowchart of table updating processing.

As shown in FIG. 10, the table updating module 510 being the UpdateTable takes an argument rid being the expansion reservation ID. In step 1002, the table updating module 510 invokes Promote (rid, 1, 1). Details of Promote function are described later with reference to the flowchart of FIG. 11.

In step 1004, the table updating module 510 selects one record of the reservation table 120 which has the rid and which can be upgraded to the running state.

In step 1006, the table updating module 510 sets the selected record to the running state and then the processing returns.

Next, processing of Promote function invoked by the UpdateTable is described with reference to the flowchart of FIG. 11. The Promote function is invoked by an argument Promote(rid, step, grade).

In step 1102, the Promote function judges whether step>MaxStep(rid)−count(select*where RID=rid and GRADE=0) is satisfied. Here, the MaxStep(rid) returns the total number of records prepared and reserved by the reservation rid in the reservation table 120. Moreover, count (select*where RID=rid and GRADE=0) is the number of records which have rid and which are currently in the running state.

When step>MaxStep(rid)−count(select*where RID=rid and GRADE=0) is satisfied, the Promote function does nothing, and the processing returns.

When step>MaxStep(rid)−count(select*where RID=rid and GRADE=0) is not satisfied, the Promote function judges whether there are records of RID=rid, STEP=step, and Grade=grade in step 1104. If there are such records, the Promote function selects one of the found records in step 1106.

The Promote function sequentially retrieves records in the reservation table 120 which share the same CPU as the record found in step 1106 in the loop from step 1108 to step 1120.

The Promote function sets the currently-selected one of the records found in step 1104 to (rid', step', grade', cpuid').

In step 1110, the Promote function judges whether the currently-selected record is a record found in step 1108. If so, the Promote function decrements each of step and grade of the record found in step 1108 by one in step 1112, and recursively invokes Promote(rid, step, grade) in step 1114. This is performed to secure a resource which is decreased by an amount corresponding to one record of STEP=step.

In step 1110, when the currently-selected record is not the record found in step 1108, the Promote function deletes the currently-selected record in step 1116, and secures the resources for the deleted record by using Promote (rid', step', grade') in step 1118.

When such processing is performed for all of the records in the reservation table 120, the Promote function passes step 1120 and the processing returns.

Referring back to step 1104, when there is no record of RID=rid, STEP=step, and Grade=grade, the Promote function selects a usable cpuid in step 1122 and inserts a new record having an entry of (rid, step, grade, cpuid). Then the processing returns.

Figure 11:
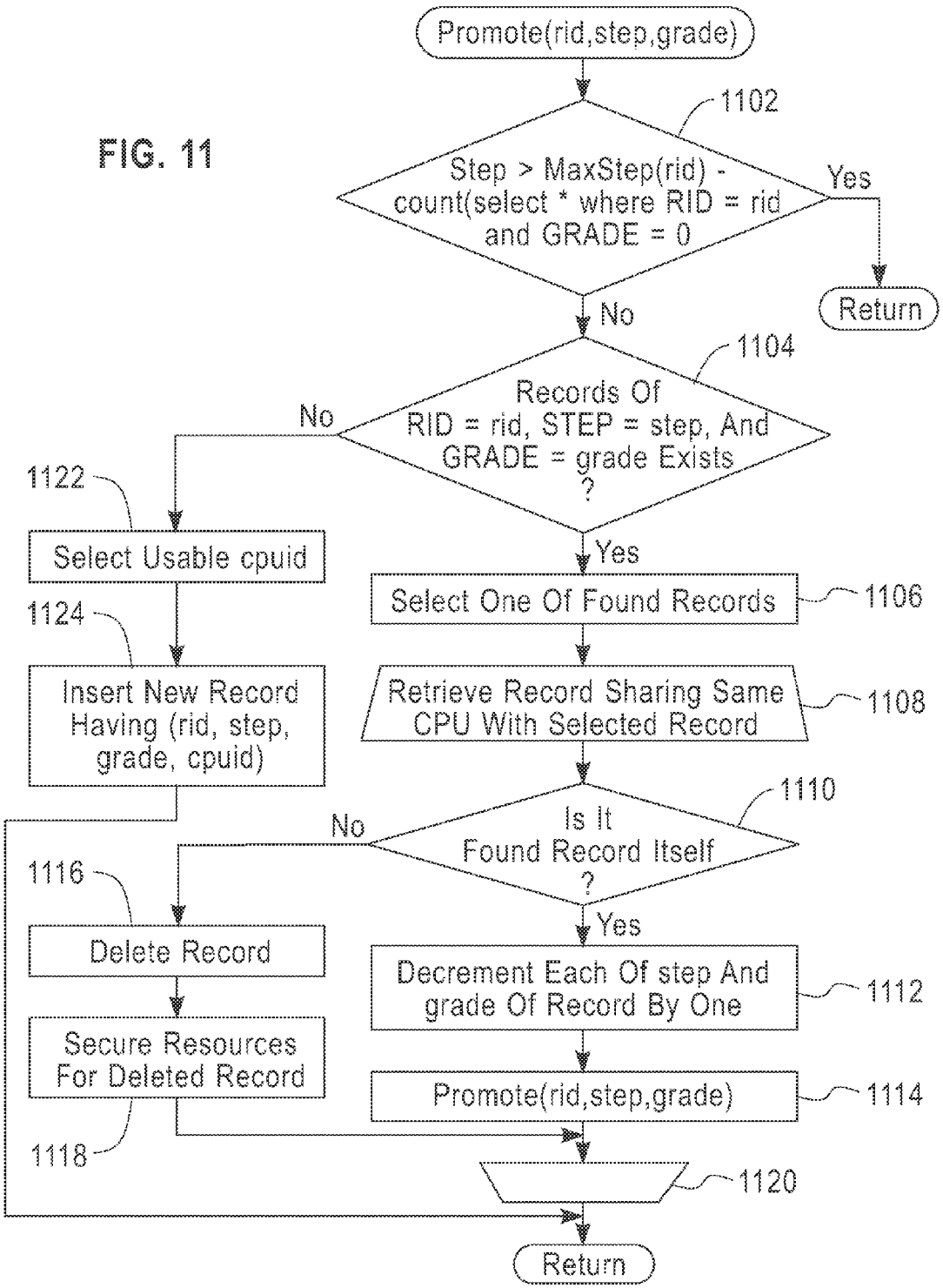
FIG. 11 is a flowchart of the table updating processing.
Figure 12:
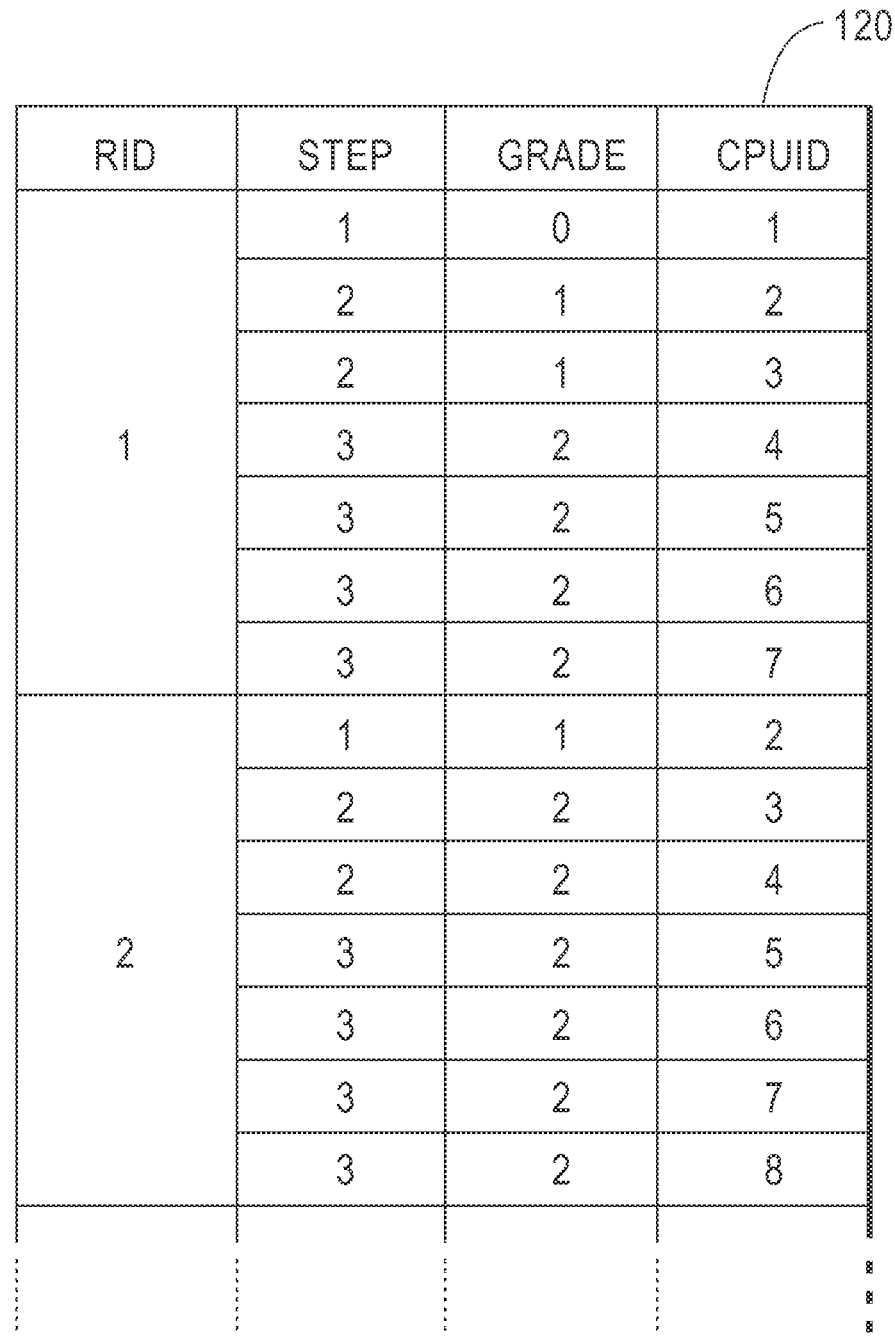
FIG. 12 shows an example of entries of a reservation table.
Figure 13:
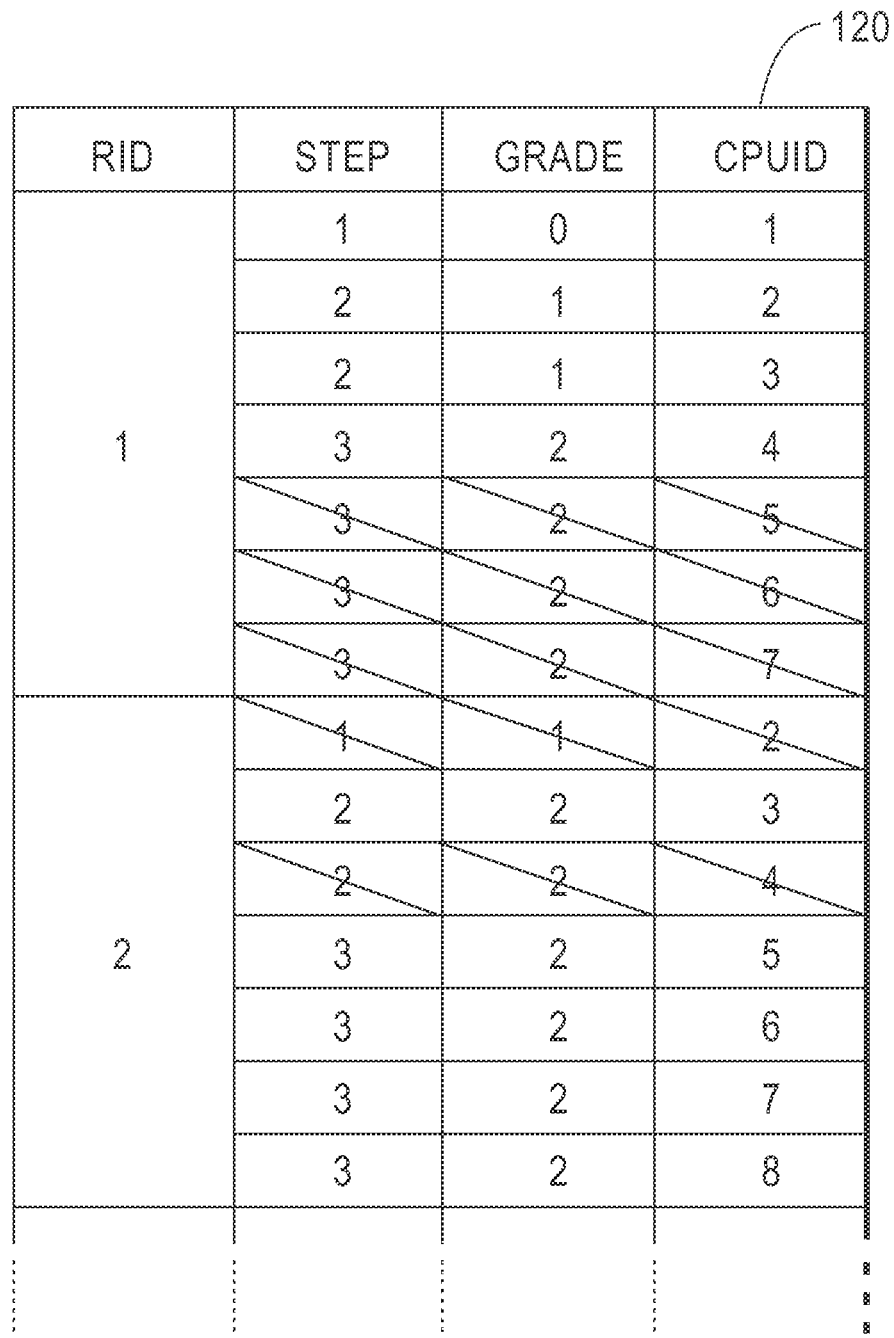
FIG. 13 shows an example of entries of the reservation table.

FIG. 13 is a view showing a result of updating the reservation table 120 in FIG. 12 in accordance with the processing of flowcharts of FIGS. 10 and 11.

Next, a quality QoDS ($t_{overall}$, $\lambda_{overall}$) of dynamic scheduling is described. Here, $t_{overall}$ refers to an overall time required to reach the running state and $\lambda_{overall}$ refers to an overall number of VM instances.

Specifically, when QoDS ($t_{overall}$, $\lambda_{overall}$) and a list of times required to reach the running state $\{t_1, t_2, \ldots, t_n\}$ (here, $t_1$ is almost zero and $t_i < t_{i+1}$ is satisfied for an arbitrary i) are given, the number $\lambda_i$ of VM instances in a i-th standby state is obtained from the following formula as an optimum standby state. In the following formula, $N^0$ is a set of integers equal to or larger than zero.

$$\lambda_i \equiv \min\{x \in N^0\} s.t. \frac{x + \sum_{j<i} \lambda_j}{t_{i+1}} > \frac{\lambda_{overall}}{t_{overall}}$$ [Formula 5]

$$(i = 1, 2, \ldots, n-1)$$

$$\lambda_n \equiv \lambda_{overall} \sum_{j<n} \lambda_j$$

In other words, the system of FIG. 1 starts up the VM instances by using ($t_i$, $\lambda_i$)=1, 2, ... n determined as described above for the clients.

A standard deviation of values of respective $t_i$ is estimated based on past data in advance. Particularly, when each $t_i$ is assumed to follow the normal distribution and σ represents the standard deviation, the following formula is established.

$$Pr(t_i \leq t_{average} + 3\sigma) \geq 99.87\%$$

$$Pr(t_i \leq t_{average} + 2\sigma) \geq 97.72\%$$

$$Pr(t_i \leq t_{average} + 1\sigma) \geq 84.12\%$$ [Formula 6]

In the above formula, Pr( ) is the probability of condition in the parentheses being established.

As shown below, when a relatively high certainty (99.87%) in time is to be achieved as in $t_i = t_{average} + 3\sigma$, the resource allocation may be relatively optimistic (80.10%) although a long time is required. Pr(QoDS) in the following formula is the probability of dynamic scheduling condition (QoDS) being satisfied.

$$t_i = t_{average} + 3\sigma \quad (99.87\%) \quad \text{[Formula 7]}$$

$$Pr(\lambda_{future} \leq \lambda_{predict}) = \frac{Pr(QoDS)}{Pr\left(t_i \leq t_{average} + 3\sigma\right)} \quad (80.10\%)$$

Meanwhile, as shown below, when a relatively low certainty (84.14%) in time is to be achieved as in $t_i = t_{average} + 1\sigma$, the resource allocation needs to be relatively pessimistic (95.08%) although the required time becomes shorter.

$$t_i = t_{average} + 1\sigma \quad (84.12\%) \quad \text{[Formula 8]}$$

$$Pr(\lambda_{future} \leq \lambda'_{predict}) = \frac{Pr(QoDS)}{Pr\left(t_i \leq t_{average} + 1\sigma\right)} \quad (95.08\%)$$

FIG. 14 shows an example of a preparation state, a preparation time, a certainty, an upper limit, resources, and a cost (pricing). As shown in FIG. 14, the preparation state includes, for example, running, swap-out, need-to-launch, need-to-boot, need-to-insert/configure, need-to-purchase (software), and need-to-purchase (hardware).

Figure 15:
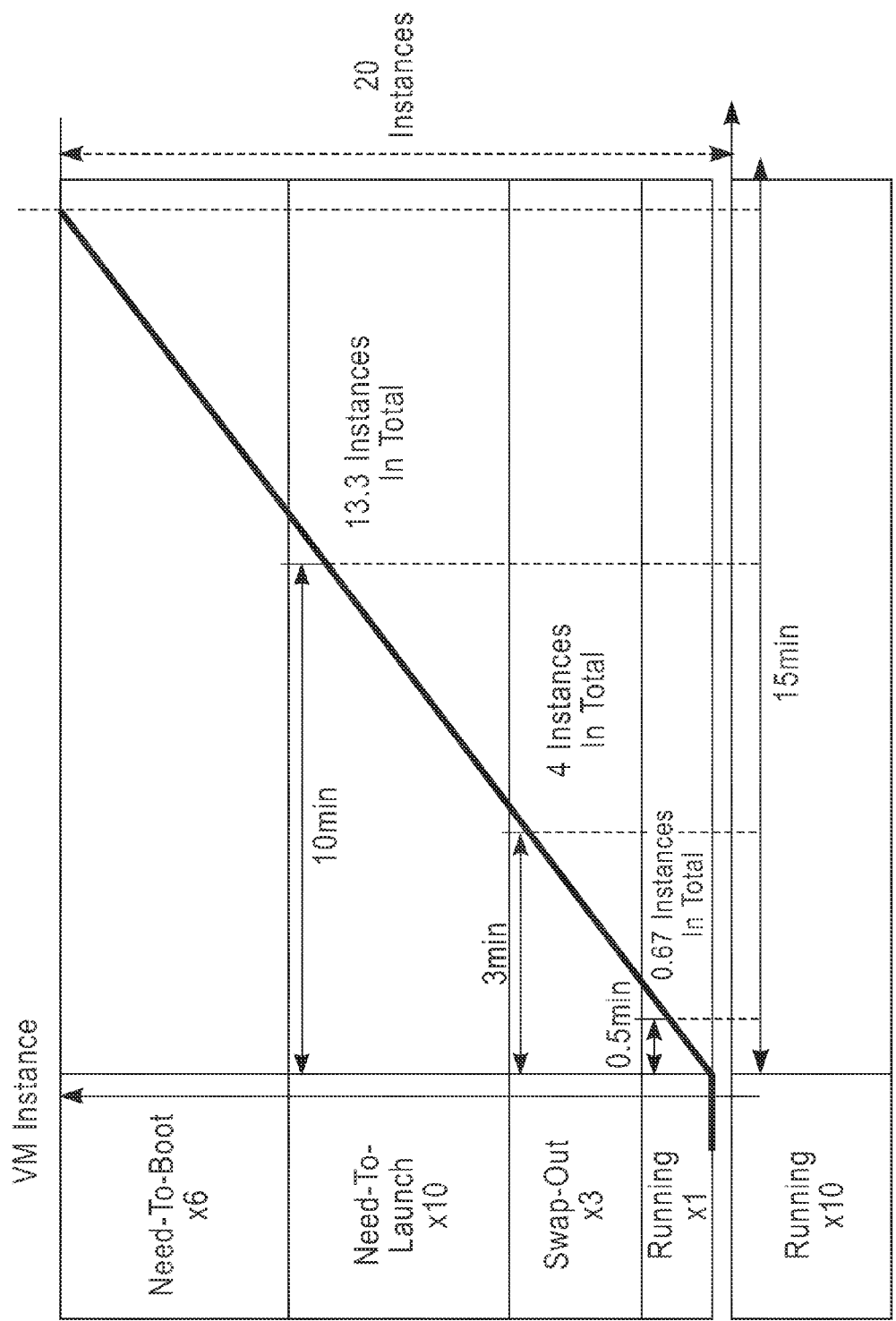
FIG. 15 shows a start-up of VM instances.

FIG. 15 shows a state where the different preparation states prepared as described above are combined to achieve a start-up time of the VM instances corresponding to the QoDS. The number of instances for each of the different preparation states is determined by the management APP 404a in accordance with the algorithm of Formula 5. The start-up of the VM instances is started, for example, immediately after the management APP 404a completes the resources allocation adjustment processing.

Figure 16:
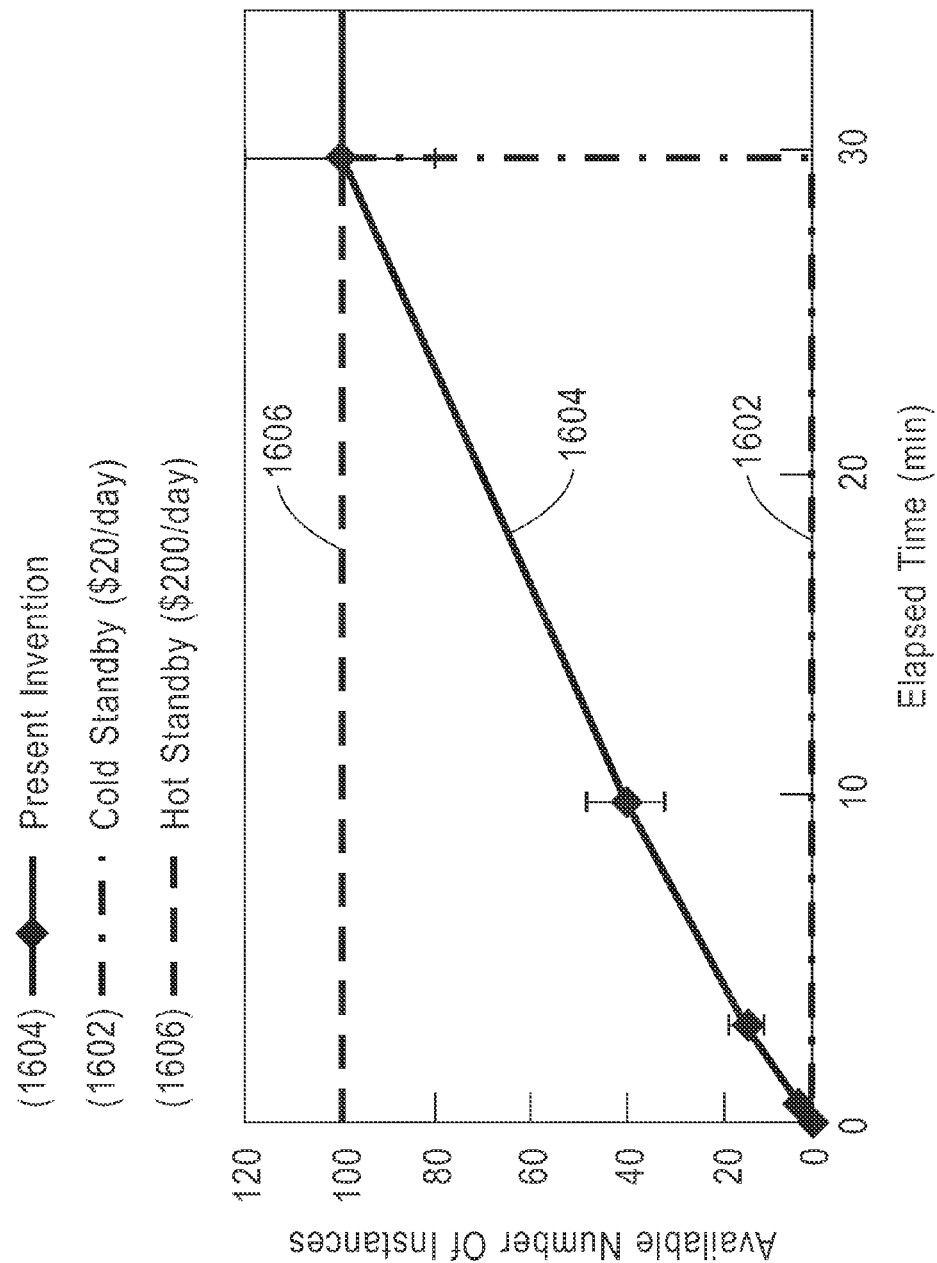
FIG. 16 schematically explains differences in performance and cost between a system of the present invention and a system of the conventional art.

FIG. 16 schematically shows an effect of the processing of the present invention. Specifically, FIG. 16 is based on the assumption that one client requires 100 instances to perform processing. In the case of a cold standby 1602, no preparation is made at the time of launch and the start-up is performed from such a state. Thus, although the cost is low, a long start-up time is required.

On the other hand, in the case of a hot standby 1604, all of the instances are running from the start. Thus, the start-up is quick, but the cost is high.

In the present invention, some of the instances are in preparation states previously advanced to certain levels. Thus, by sequentially launching the instances in the different preparation states in combination, a start-up time satisfying the request is achieved while the cost is suppressed to a reasonable range.

Specifically, in the conventional technique, if 100 instances are to be provided to a user within a certain time, the 100 instances need to run constantly. This consumes resources in the cloud server and makes the user owe a relatively high charge.

Alternatively, if the 100 instances are set to a non-operational state, the conventional technique does not require the user to pay a relatively low charge, but does not achieve the start-up time requested by the user.

Meanwhile, in the present invention, the 100 instances are prepared in such a way that one instance is in the running state, two instances are in the swap-out state, 12 instances are in the need-to-launch state, 25 instances are in the need-to-boot state, and 60 instances are in the need-to-insert/configure state. Thus, with keeping the active resource as small as possible, the resource preparation can be completed within the time requested by the user. Hence, an optimal balance between the user charge and the available resources in the server is achieved.

The embodiment of the present invention is described above by using the specific computer platform. However, the present invention is not limited to such a specific computer platform. Those skilled in the art should understand that the present invention can be carried out in any server environment as long as the sever environment is one which includes multiple computing nodes and which is capable of creating multiple virtual machines by virtualizing the computing nodes.

What is claimed is:

1. A dynamic resource allocation method for a server system having resources including a plurality of computing nodes, the method implemented by the server system performing dynamic allocation of resources in response to a request from a client computer, the method comprising:

preparing a plurality of virtual machine instances including at least one virtual machine instance in each of a plurality preparation states, wherein the plurality preparation states comprise a running state, a swap-out state, a need-to-launch state, a need-to-boot state, and a need-to-install state and wherein a number of virtual machine instances is determined according to a formula;

receiving a request on a dynamic scheduling condition from the client computer, wherein the request specifies a requested number of virtual machine instances, a requested time period, and a request certainty that the specified number of virtual machines will reach a running state in the requested time period;

determining a current certainty that the requested number of virtual machine instances will reach a running state in the requested time period based on the number of instances in each preparation state in the plurality of virtual machine instances;

responsive to determining the requested certainty is satisfied based on the current certainty, launching at least two of the plurality of virtual machine instances in a combination of the plurality of preparation states to achieve the dynamic scheduling condition;

retaining a reservation table including fields for an ID of the request, an ID provided for each processing unit of the computing nodes, and a corresponding preparation state;

in response to reception of a request to use a processing unit from the client computer, determining whether the processing unit is allocatable on the basis of the reservation table;

if the processing unit is allocatable, updating the reservation table to reflect the allocation and allocating the processing unit to the request;

responsive to adding a virtual machine instance to the plurality of virtual machine instances, performing a resource allocation adjustment;

wherein performing the resource adjustment comprises:

determining whether each requested certainty of requests in the reservation table is satisfied based on a determined current certainty;

responsive to determining a given requested certainty of a given request is not satisfied, allocating a new hardware resource to the plurality of virtual machine instances.

2. The dynamic resource allocation method according to claim 1, further comprising:

in response to the allocation of the processing unit to the request, setting a field for the corresponding preparation state in the reservation table to the corresponding preparation state.

3. A computer readable, non-transitory, storage medium tangibly embodying computer readable program code having computer readable instructions which, when executed, cause a computer to carry out a method for dynamic resource allocation for a server system having resources of a plurality of computing nodes, in response to a request from a client computer, the method comprising preparing a plurality of virtual machine instances including at least one virtual machine instance in each of a plurality preparation states, wherein the plurality preparation states comprise a running state, a swap-out state, a need-to-launch state, a need-to-boot state, and a need-to-install state and wherein a number of virtual machine instances is determined according to a formula;

receiving a request on a dynamic scheduling condition from the client computer, wherein the request specifies a requested number of virtual machine instances, a requested time period, and a request certainty that the specified number of virtual machines will reach a running state in the requested time period;

determining a current certainty that the requested number of virtual machine instances will reach a running state in the requested time period based on the number of instances in each preparation state in the plurality of virtual machine instances;

responsive to determining the requested certainty is satisfied based on the current certainty, launching at least two of the plurality of virtual machine instances in a combination of the plurality of preparation states to achieve the dynamic scheduling condition;

retaining a reservation table including fields for an ID of the request, an ID provided for each processing unit of the computing nodes, and a corresponding preparation state;

in response to reception of a request to use a processing unit from the client computer, determining whether the processing unit is allocatable on the basis of the reservation table;

if the processing unit is allocatable, updating the reservation table to reflect the allocation and allocating the processing unit to the request;

responsive to adding a virtual machine instance to the plurality of virtual machine instances, performing a resource allocation adjustment;

wherein performing the resource adjustment comprises:

determining whether each requested certainty of requests in the reservation table is satisfied based on a determined current certainty;

responsive to determining a given requested certainty of a given request is not satisfied, allocating a new hardware resource to the plurality of virtual machine instances.

4. The computer readable storage medium according to claim 3, further comprising computer readable instructions for causing the computer to perform, in response to the allocation of the processing unit to the request, setting a field for the corresponding preparation state in the reservation table to the corresponding preparation state.

5. A dynamic resource avocation system in a server system having resources including a plurality of computing nodes, the dynamic resousce allocation system comprising:
a memory;
a processor communicatively coupled to the memory; and
a dynamic resource allocation module communicatively coupled to the memory and the processor, wherein the dynamic resource allocation module is configured to perform the steps of a method comprising:
preparing a plurality of virtual machine instances including at least one virtual machine instance in each of a plurality preparation states, wherein the plurality preparation states comprise a running state, a swap-out state, a need-to-launch state, a need-to-boot state, and a need-to-install state and wherein a number of virtual machine instances is determined according to a formula;
receiving a request on a dynamic scheduling condition from the client computer, wherein the request specifies a requested number of virtual machine instances, a requested time period, and a request certainty that the specified number of virtual machines will reach a running state in the requested time period;
determining a current certainty that the requested number of virtual machine instances will reach a running state in the requested time period based on the number of instances in each preparation state in the plurality of virtual machine instances;
responsive to determining the requested certainty is satisfied based on the current certainty, launching at least two of the plurality of virtual machine instances in a combination of the plurality of preparation states to achieve the dynamic scheduling condition;

retaining a reservation table including fields for an ID of the request, an ID provided for each processing unit of the computing nodes, and a corresponding preparation state;

in response to reception of a request to use a processing unit from the client computer, determining whether the processing unit is allocatable on the basis of the reservation table;

if the processing unit is allocatable, updating the reservation table to reflect the allocation and allocating the processing unit to the request;

responsive to adding a virtual machine instance to the plurality of virtual machine instances, performing a resource allocation adjustment;

wherein performing the resource adjustment comprises:

determining whether each requested certainty of requests in the reservation table is satisfied based on a determined current certainty;

responsive to determining a given requested certainty of a given request is not satisfied, allocating a new hardware resource to the plurality of virtual machine instances.

6. The dynamic resource allocation system according to claim 5, the method further comprising: in response to the allocation of the processing unit to the request, setting a field for the corresponding preparation state in the reservation table to the corresponding preparation state.

7. The dynamic resource allocation method according to claim 1, further comprising: responsive to removing a virtual machine instance from the plurality of virtual machine instances, performing a resource allocation adjustment.

8. The dynamic resource allocation method according to claim 7, wherein performing the resource adjustment comprises: determining whether each requested certainty of requests in the reservation table is satisfied based on a determined current certainty; responsive to determining a given requested certainty of a given request is not satisfied, allocating a new hardware resource to the plurality of virtual machine instances.

9. The computer readable storage medium according to claim 3, further comprising computer readable instructions for causing the computer to perform: responsive to removing a virtual machine instance from the plurality of virtual machine instances, performing a resource allocation adjustment.

10. The computer readable storage medium according to claim 9, wherein performing the resource adjustment comprises: determining whether each requested certainty of requests in the reservation table is satisfied based on a determined current certainty; responsive to determining a given requested certainty of a given request is not satisfied, allocating a new hardware resource to the plurality of virtual machine instances.

11. The dynamic resource allocation system according to claim 5, the method further comprising: responsive to removing a virtual machine instance from the plurality of virtual machine instances, determining whether each requested certainty of requests in the reservation table is satisfied based on a determined current certainty; responsive to determining a given requested certainty of a given request is not satisfied, allocating a new hardware resource to the plurality of virtual machine instances.

* * * * *